United States Patent
Gupta et al.

(10) Patent No.: US 8,434,864 B2
(45) Date of Patent: May 7, 2013

(54) MULTIFOCAL OPHTHALMIC LENS WITH DISCONTINUITIES

(75) Inventors: Amitava Gupta, Roanoke, VA (US); Ronald D. Blum, Roanoke, VA (US)

(73) Assignee: PixelOptics, Inc., Roanoke, VA (US)

( * ) Notice: Subject to any disclaimer, the term of this patent is extended or adjusted under 35 U.S.C. 154(b) by 173 days.

(21) Appl. No.: 12/859,649

(22) Filed: Aug. 19, 2010

(65) Prior Publication Data
US 2011/0058143 A1    Mar. 10, 2011

Related U.S. Application Data

(60) Provisional application No. 61/236,129, filed on Aug. 23, 2009, provisional application No. 61/245,692, filed on Sep. 25, 2009, provisional application No. 61/248,638, filed on Oct. 5, 2009.

(51) Int. Cl.
*G02C 7/06* (2006.01)

(52) U.S. Cl.
USPC ................ 351/159.42; 351/159.06

(58) Field of Classification Search ............... 351/161, 351/164, 168, 169, 159.05, 159.06, 159.14, 351/159.4, 159.41, 159.42
See application file for complete search history.

(56) References Cited

U.S. PATENT DOCUMENTS

| 4,062,629 A | 12/1977 | Winthrop |
| 4,461,550 A | 7/1984 | Legendre |
| 5,305,028 A | 4/1994 | Okano |
| 6,086,203 A * | 7/2000 | Blum et al. ............ 351/169 |
| 2011/0261318 A1 * | 10/2011 | Spratt et al. ............ 351/169 |

* cited by examiner

*Primary Examiner* — Darryl J Collins
(74) *Attorney, Agent, or Firm* — Kilpatrick Townsend & Stockton LLP

(57) ABSTRACT

Aspects of the present invention provide multifocal ophthalmic lenses—for example, an ophthalmic lens having a progressive addition optical power region—having one or more discontinuities. The discontinuities can be used to merge or connect regions of the lens surface having different curvatures or average optical power. The use of discontinuities can obviate the need for blend zones which are largely responsible for the introduction of unwanted astigmatism in conventional lenses. In turn, a multifocal ophthalmic lens of the present invention can provide a desired additive power with less unwanted astigmatism than a conventional progressive addition lens (PAL).

11 Claims, 5 Drawing Sheets

MULTIFOCAL OPHTHALMIC LENS WITH DISCONTINUITIES

CROSS-REFERENCE TO RELATED APPLICATIONS

This application claims priority from and incorporates by reference in their entirety the following provisional applications:
U.S. Appl. No. 61/236,129, filed on Aug. 23, 2009;
U.S. Appl. No. 61/245,692, filed on Sep. 25, 2009; and
U.S. Appl. No. 61/248,638, filed on Oct. 5, 2009.

BACKGROUND OF THE INVENTION

1. Field of the Invention

The present invention generally relates to multifocal ophthalmic lenses. More specifically, the present invention provides improved progressive addition lenses (PALs) having one or more discontinuities.

2. Background Art

The only technique of conventional PALs to merge or connect surface segments having different curvatures or average optical power is the use of blend zones. In general, blend zones comprise a continuous change in curvature or average power in areas of a PAL surface where a divergence of sagittal and tangential curvatures exists. By merging areas of different curvature in this way, unwanted astigmatism on the surface of the PAL is introduced. Conventional PAL design involves optimizing the distribution of this unwanted astigmatism to minimize its effect on the visual performance of the lens. Accordingly, what is needed is a multifocal ophthalmic lens design that provides another technique for merging or connecting regions having different curvatures or average power so as to provide an improved PAL design.

BRIEF DESCRIPTION OF THE DRAWINGS/FIGURES

DETAILED DESCRIPTION OF THE INVENTION

Aspects of the present invention provide multifocal ophthalmic lenses—for example, an ophthalmic lens having a progressive addition optical power region—having one or more discontinuities. The discontinuities can be discontinuities of surface slope and can be used to merge or connect regions of the lens surface having different curvatures or average optical power. The use of discontinuities can obviate the need for blend zones which are largely responsible for the introduction of unwanted astigmatism. In turn, a multifocal ophthalmic lens of the present invention can provide a desired additive power with less unwanted astigmatism than a conventional progressive addition lens (PAL).

An ophthalmic lens of the present invention can comprise one or more surface segments of different curvature or average power. An ophthalmic lens of the present invention can further comprise one or more discontinuities—e.g., one or more optical zones having a boundary fully or partially defined by a discontinuity such as a surface slope discontinuity—that can be used to merge, connect or link theses different surface segments. The use of discontinuities in accordance with an aspect of the present invention can obviate the need for a blend zone as is found in conventional progressive lenses, thereby reducing the introduction of unwanted astigmatism while providing continuity of optical power, prism or surface sag.

According to an aspect of the present invention, an optical zone—having all or a portion of its periphery or boundary defined by a discontinuity—can be positioned on any portion of any surface of an ophthalmic lens. Such an optical zone can contribute to the optical power of any viewing zone of the lens—e.g., the near vision zone. The optical zones of the present invention can be collapsed onto the surface of a progressive addition optical power region of an ophthalmic lens. By introducing an optical zone having a portion of its boundary forming a discontinuity onto the surface of the ophthalmic lens, unwanted astigmatism can be limited or reduced in comparison to an ophthalmic lens not incorporating such a design element. The optical zones of the present invention can be, but are not limited to, rotationally symmetric optical zones or optical zones exhibiting bilateral symmetry.

Figure 1:
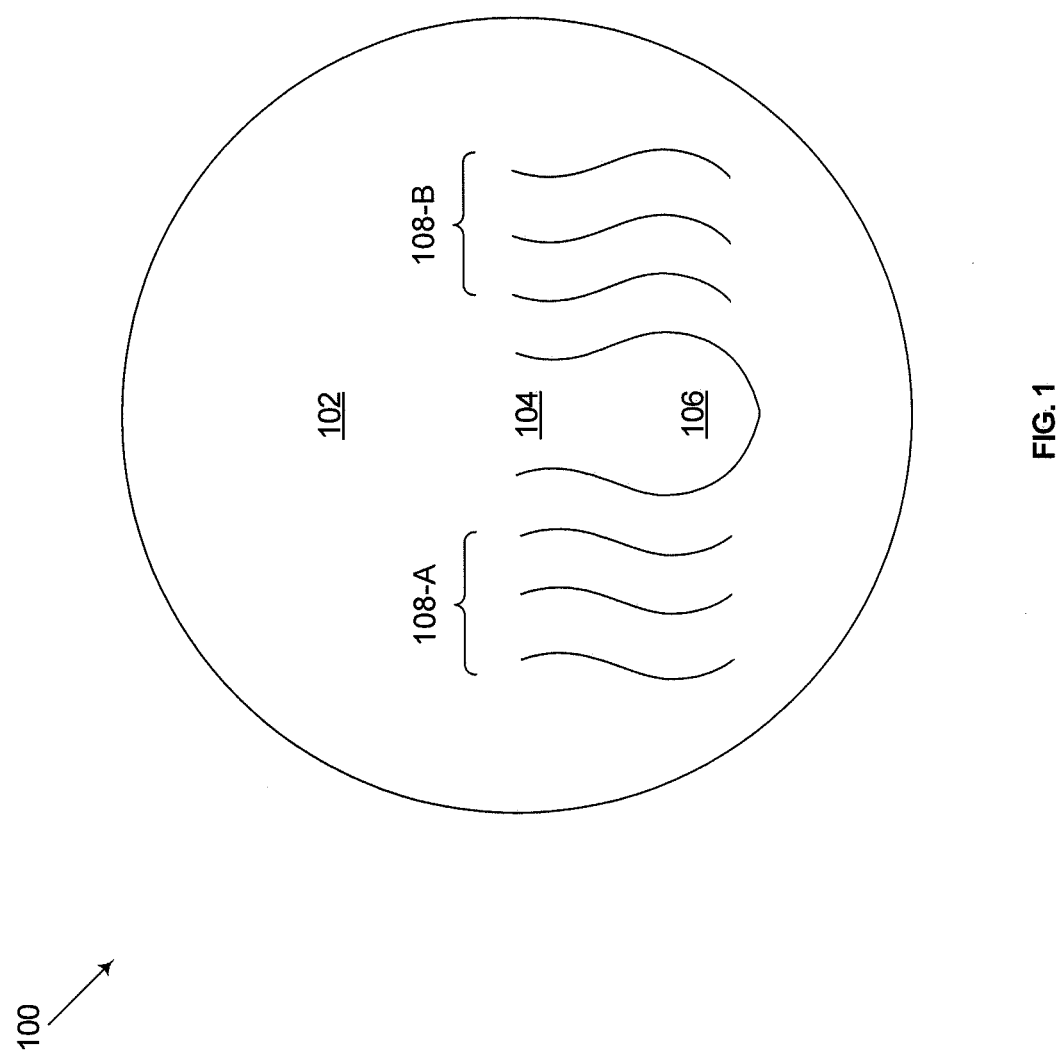
FIG. 1 illustrates a conventional progressive addition lens (PAL).

FIG. 1 illustrates a conventional PAL 100. The PAL 100 can represent a typical state of the art PAL produced using conventional design considerations and requirements. The PAL 100 can comprise a far distance viewing zone 102, an intermediate distance viewing zone 104, and a near distance viewing zone 106. The intermediate distance viewing zone 104 can also be considered to be or can represent a portion of a channel that has a variable optical power. The intermediate distance viewing zone or channel 104 can link or connect the different constant optical powers provided by the far distance viewing zone 102 and the near distance viewing zone 106.

The PAL 100 can include unwanted astigmatism regions positioned adjacent to a first side of the channel 104 and a second side of the channel 104. Specifically, a first region of unwanted astigmatism 108-A can be located adjacent to a first side of the channel 104 and a second region of unwanted astigmatism 108-B can be located adjacent to a second side of the channel 104. The magnitude of the unwanted astigmatism in each region 108-A and 108-B can increase when moving away from the channel 104 towards a periphery of the PAL 100.

The unwanted astigmatism regions 108-A and 108-B of the PAL 100 result from the introduction of blend zones on the surface of the PAL 100. Blend zones are introduced onto the surfaces of conventional PALs to merge or connect—in a continuous manner—regions of the surface having different curvatures or average optical power. Specifically, blend zones provide a continuous change in curvature or average power in areas on the PAL 100 surface where there is divergence in sagittal and/or tangential curvatures. The introduction of blend zones can lead to the introduction of unwanted astigmatism, as will be appreciated by one skilled in the pertinent art. In general, the more blend zones (in terms of magnitude and size), the more unwanted astigmatism introduced on a lens surface.

Figure 2:
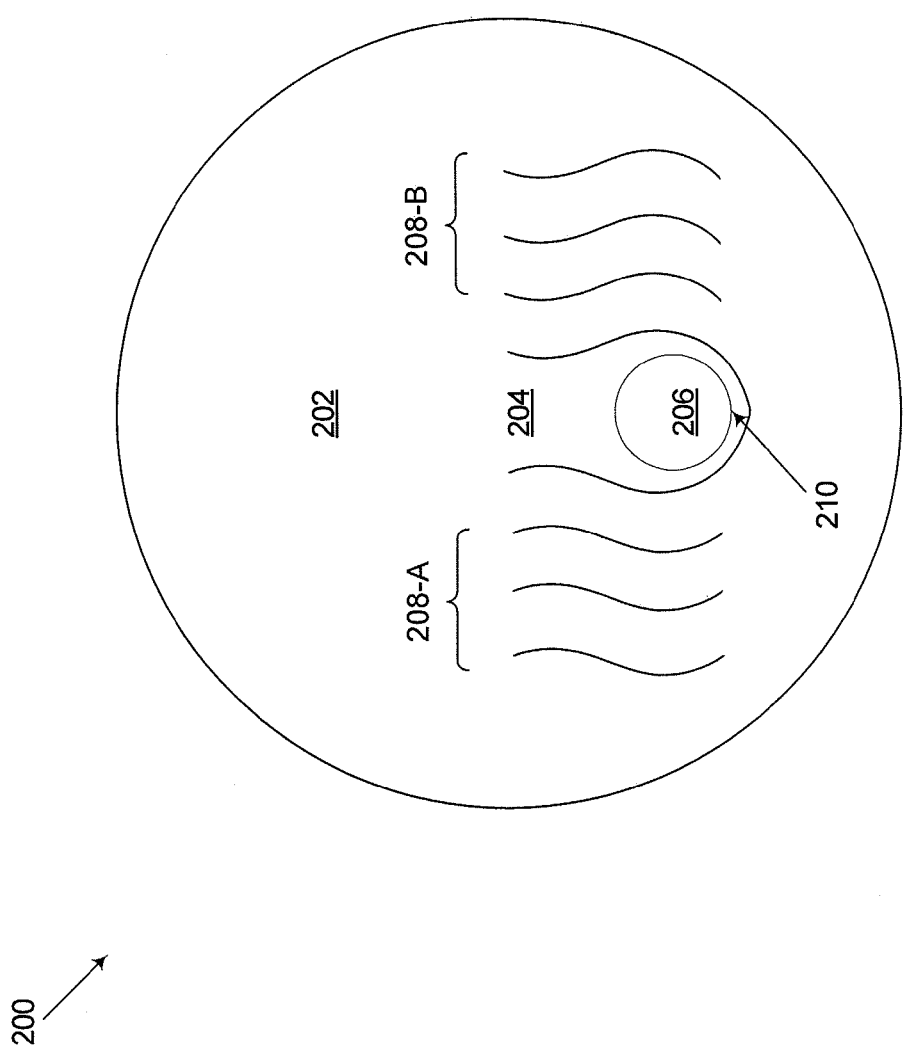
FIG. 2 illustrates an ophthalmic lens of the present invention having a rotationally symmetric optical zone.

FIG. 2 illustrates an ophthalmic lens 200 of the present invention having a rotationally symmetric optical zone 210. The lens 200 can reduce the use of blend zones by introduction of the rotationally symmetric zone 210. As a result, unwanted astigmatism of the lens 200 can be reduced.

The lens 200 can include a far distance viewing zone 202, a channel 204, and a near distance viewing zone 206 formed by a conventional progressive addition optical power region. The rotationally symmetric optical zone 210 can have a boundary that forms a discontinuity that surrounds the zone 210 or only a portion of the zone 210. The portion of the boundary of the zone 210 that does not form a discontinuity can be blended. The discontinuity associated with the rotationally symmetric optical zone can be a discontinuity of surface slope.

As shown in FIG. 2, the rotationally symmetric optical zone 210 can overlap the near distance viewing zone 206 of the progressive addition optical power region. The rotationally symmetric optical zone 210 can contribute a first portion of a total add power of the lens 200. The near distance viewing zone 206 of the progressive addition optical power region can form a second portion of a total add power of the lens 200. Together, the rotationally symmetric optical zone 210 and the near distance viewing zone 206 of the progressive addition optical power region can provide the total or desired near add power of the lens 200.

The ophthalmic lens 200 can have lower levels of unwanted astigmatism at certain locations in comparison to the ophthalmic lens 100 as a result of introducing the rotationally symmetric optical zone 210 having all or a portion of its border forming a discontinuity. Further, combining a low power progressive additive optical power region (not comprising the full add power of the final lens) with that of a low power optical zone of the present invention (also not comprising the full add power of the final lens) to together provide the total required add power enables the final lens to have less distortion and wider fields of vision with lower unwanted astigmatism (in comparison to a lens having a single optical element—e.g., a progressive addition optical power region—providing the full add power of the lens).

In general, optical zones of the present invention—e.g., the rotationally symmetric optical zone 210—can be of any shape or size and can be placed onto any portion of a lens surface such that it overlaps any portion of any viewing zone or periphery of the lens. The optical zones of the present invention can be of substantially constant power—i.e., spherical in shape. The optical zones of the present invention can alternatively be aspheric—i.e., comprising a continuous change in curvature. The optical zones of the present invention can be rotationally symmetrical or can have fewer elements of symmetry—e.g., inversion symmetry or bilateral symmetry. Alternatively, the optical zones of the present invention can be of arbitrary shape and can be constructed to match contours of constant curvature that are associated with the optical design of a progressive addition lens.

The boundary of an optical zone of the present invention can comprise any type of discontinuity and can be specified in terms of surface sag, slope and tilt. Further, the discontinuity associated with an optical zone of the present invention can be of any optical power—e.g., 0.50 D or less—and can be a surface sag discontinuity, a surface slope discontinuity characterized by a change in slope or prism, and/or a power or curvature discontinuity featuring an abrupt change in power or curvature.

Rotationally symmetric optical zones of the present invention can be regressive or non-regressive. A regressive rotationally symmetric optical zone of the present invention can provide an optical power at its center that is lower than the optical power provided at its boundary. A non-regressive rotationally symmetric optical zone of the present invention can provide an optical power at its center that is higher than the optical power provided at the boundary. For both a regressive and non-regressive optical zone, any optical power profile can be provided between the center and boundary of the optical zone.

According to an aspect of the present invention, a non-regressive rotationally symmetric optical zone can be collapsed or combined onto the near vision zone of a PAL to form a multifocal ophthalmic lens in accordance with an aspect of the present invention. According to an aspect of the present invention, a regressive rotationally symmetric optical zone segment can be collapsed or combined onto the far vision zone of a PAL to form a multifocal ophthalmic lens in accordance with an aspect of the present invention. Additional aspects of the present invention include collapsing or combining rotationally symmetric optical zones with peripheral areas of a PAL optic so as to modulate the power profile of that region of the optic and to reduce unwanted astigmatism.

Figure 3:
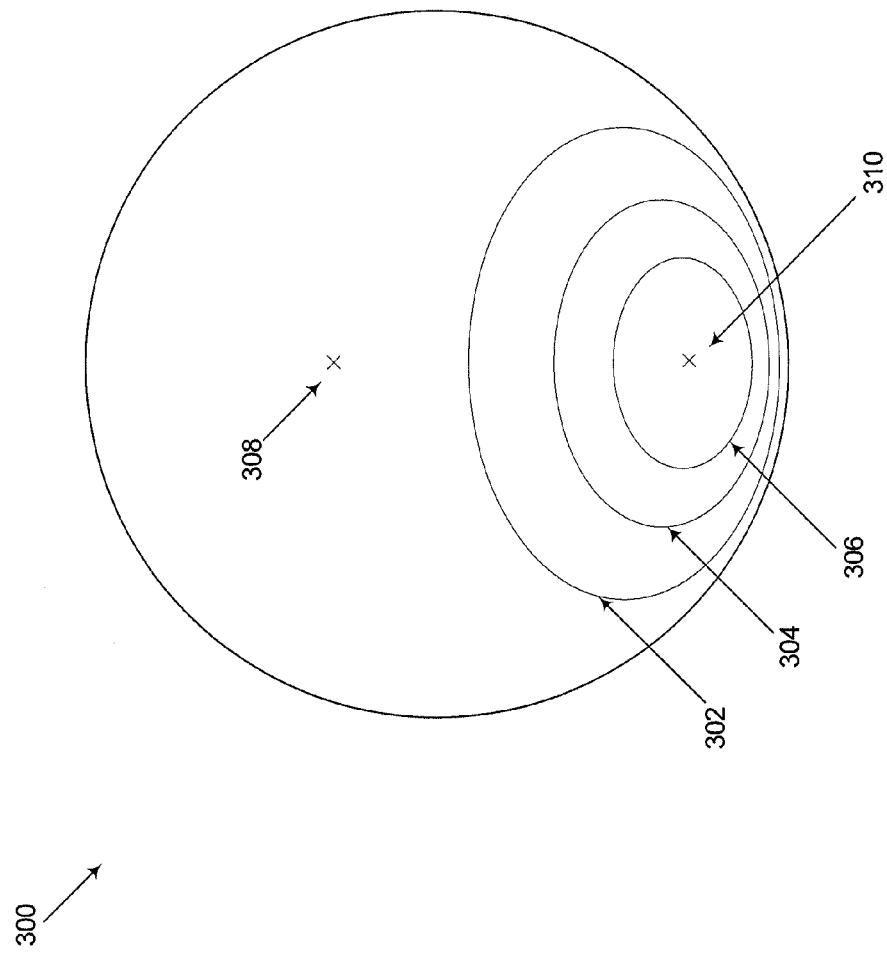
FIG. 3 illustrates an ophthalmic lens of the present invention comprising three discontinuous optical zones.

FIG. 3 illustrates an ophthalmic lens 300 of the present invention comprising three discontinuous optical zones 302, 304 and 306. The optical zones 302, 304 and 306 enable discontinuities in average power to be added to the ophthalmic lens 300 (e.g., a progressive addition lens) design in order to reduce and limit the blend in curvature required to create a continuous surface comprising a far vision point 308 (or fitting point) and a near vision point 310.

As an example, the ophthalmic lens 300 can have an add power of 2.00 D. The distance between the fitting point 308 and the near vision point can be 16.0 mm. The three discontinuous optical zones 302, 304 and 306 can be elliptical in shape and may be positioned onto the surface of the progressive addition region of the ophthalmic lens 300 as shown in FIG. 3. Each discontinuous optical zone 302, 304 and 306 can have a 0.25 D discontinuity and can involve a discontinuous change in surface slope. The first discontinuous optical zone 306 can intersect the channel (principal meridian) of the lens 300 at approximately 13.0 mm below the fitting point 308. The second discontinuous optical zone 304 can intersect the channel (principal meridian) of the lens 300 at approximately 11.0 mm below the fitting point 308. The third discontinuous optical zone 302 can intersect the channel (principal meridian) of the lens 300 at approximately 6.0 mm below the fitting point 308.

Moving from the fitting point 308 to the near point of the lens 300, each optical zone 302, 304 and 306 provide an increase of 0.25 D over an adjacent area of the lens. Therefore, together, the discontinuous optical zones 302, 304 and 306 provide an increase of 0.75 D in optical power difference between the fitting point 308 and the near point of the lens 300. Further, the discontinuous optical zones 302, 304 and 306 can reduce the slope in average power to an overall (average) value of 1.25 D over 16 mm, 62.5% of the slope that will be required in a state of the art PAL design. Such a reduction in slope will result in lower peak unwanted astigmatism in the final lens 300 design, in the range 0.50 D to 1.25 D, depending on the optimization scheme employed in the creating the design, and the magnitude and contours of asphericity allowed on the surface of the ophthalmic lens 300.

Figure 4:
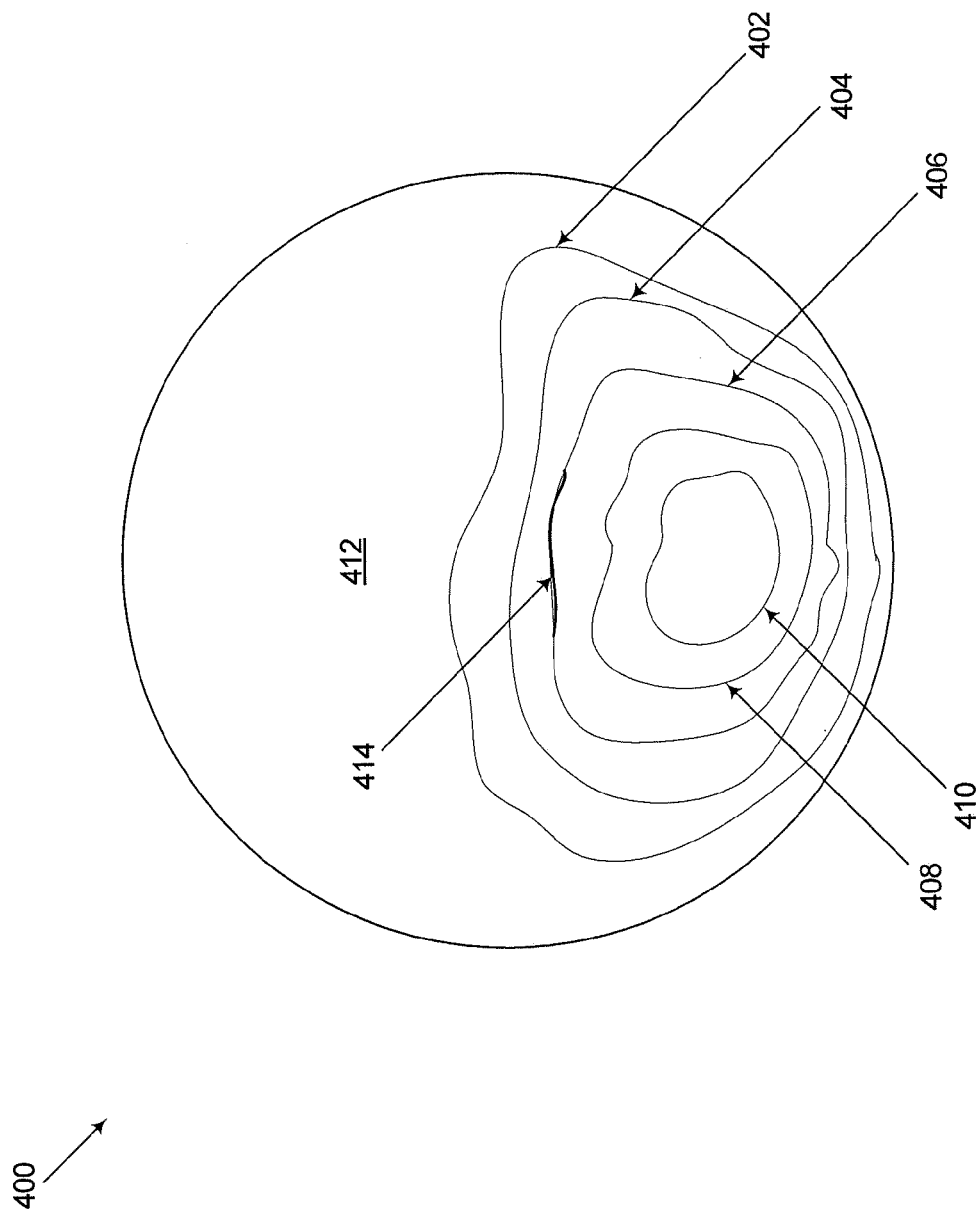
FIG. 4 illustrates a PAL with exemplary average power contours.

According to an aspect of the present invention, one or more discontinuities can be introduced onto the surface of a PAL that can coincide with the contours of average power typically found on a PAL. FIG. 4 illustrates a PAL 400 with exemplary average power contours. The PAL 400 can comprise several contours of differing average power that contribute to the add power of the PAL 400 when compared to a plano portion or distance viewing region 412 of the PAL 400. As shown in FIG. 4, the PAL 400 can have a first average power contour 402, a second average power contour 404, a third average power contour 406, a fourth average power contour 408, and a fifth average power contour 410.

The average optical power provided by each region or contour can increase between the first and fifth average power contours 402 and 410. As an example, the first average power contour 402 can provide 0.50 D of additive optical power, the second average power contour 404 can provide 0.75 D of additive optical power, the third average power contour 406 can provide 1.00 D of additive optical power, the fourth average power contour 408 can provide 1.50 D of additive optical power, and the fifth average power contour 410 can provide 2.00 D of additive optical power.

In conventional PALs, the different average power contours are blended such that no discontinuity exists between any average power contour. In contrast to these conventional designs, an aspect of the present invention can provide a discontinuity (e.g., a slope discontinuity) that coincides with one or more contours of average power. The discontinuity can coincide with all or a portion of any contour boundary and multiple discontinuities can be used.

As an example, an aspect of the present invention can position a slope discontinuity 414 along the 1.00 D contour of average power 406. As a result, the transition from the substantially spherical region defined by the average power contour 404 to the substantially spherical surface having a steeper (or lower) curvature defined by the average power contour 406 will not be entirely continuous. The slope discontinuity can be of any value and can be, for example, 0.18 D. Placement of one or more discontinuities that coincide with the average power contour 406 can obviate the need for a blend zone between the adjacent regions of different optical power. As a result, unwanted astigmatism buildup to the periphery of the channel of the PAL 400 can be reduced.

Discontinuities placed between substantially constant contours of power can intersect the principal meridian. When this occurs, each segment in between two neighboring discontinuities may be rendered aspheric in order to minimize the number of discontinuities needed, allowing blended astigmatism to build up to lower threshold levels. For example, the average power contours 404 and 406 can be rendered aspheric to minimize the optical power jump at the placement of the discontinuity 414 between the two regions.

According to an aspect of the present invention, one or more discontinuities can be introduced onto the surface of a PAL that can coincide with the contours of substantially equal astigmatism typically found on a PAL. In this way, an aspect of the present invention can provide a discontinuous transition between a toric blended surface and a spherical or aspheric surface along contours of substantially equal astigmatism. The magnitude of such an introduced discontinuity can vary over the optic surface since it can match the sag mismatch between the two sides of the discontinuity and can depend on not only the astigmatism but the average power of each zone. For example, a discontinuity that provides a transition between a surface with 1.00 D astigmatism and one that is coplanar with the base curve will vary in its magnitude over the surface of the optic, since the effective differences in slope are dependent not only on the astigmatism but the effective power at any point of the optic.

The optical discontinuity or discontinuities of a PAL of the present invention can therefore be located along one or more of these contours of astigmatism located on each side of the channel of a PAL. As an example, the optical discontinuity can be located along the astigmatic contour of 1.00 D of unwanted astigmatism located on both sides of the channel. As a result, the introduced discontinuities and can keep the PAL surface to this level of 1.00 D of unwanted astigmatism by transitioning from the aspheric surface that results in unwanted astigmatism at the optical discontinuity which is located at this 1.00 D contour to a spherical surface coplanar with the base curve. One advantage of deploying discontinuities (slope or sag) along astigmatic contours is that they will not cross the principal meridian or intrude into the principal viewing zones such as the far vision zone or the near vision zone.

Figure 5:
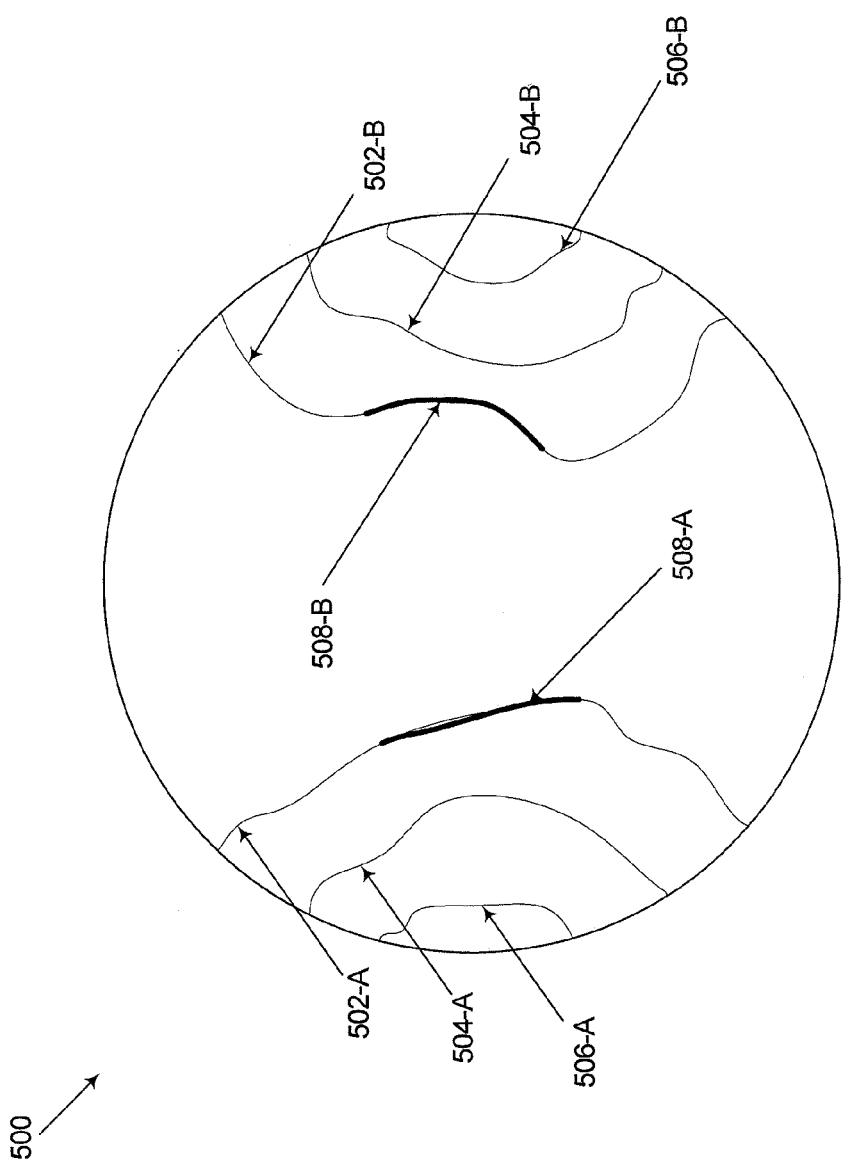
FIG. 5 illustrates exemplary astigmatism contours of a PAL.

FIG. 5 illustrates exemplary astigmatism contours of a PAL 500. The PAL 500 can include unwanted astigmatism regions positioned adjacent to a first side of the channel of the PAL 500 and a second side of the channel of the PAL 500. Astigmatism contours 502-A and 502-B can indicate a first value of unwanted astigmatism. Astigmatism contours 504-A and 504-B can indicate a second value of unwanted astigmatism (e.g., a value higher than the first value of unwanted astigmatism). Astigmatism contours 506-A and 506-B can indicate a third value of unwanted astigmatism (e.g., a value higher than the second value of unwanted astigmatism). As an example, in accordance with an aspect of the present invention, discontinuities (e.g., discontinuities in slope) 508-A and 508-B can be placed along a portion of the astigmatism contours 502-A and 502-B as shown in FIG. 5.

An ophthalmic lens of the present invention can comprise a single layer lens (i.e., a monolithic lens) or a multiple layer lens (i.e., a composite lens comprising two or more layers). An ophthalmic lens of the present invention can comprise a finished, unfinished or semi-finished lens blank.

A discontinuity or an optical zone comprising a discontinuity in accordance with an aspect of the present invention can be positioned on any surface of a single layer or multiple layer lens. That is, a discontinuity or an optical zone comprising a discontinuity in accordance with an aspect of the present invention can be positioned on any internal or external surface of a lens.

Further, a discontinuity or an optical zone comprising a discontinuity in accordance with an aspect of the present invention can be placed on a first surface of a lens so as to be in optical communication with any other optical feature or element positioned on a second surface of the lens. For example, a discontinuity or an optical zone comprising a discontinuity in accordance with an aspect of the present invention can be combined or collapsed onto a first progressive addition region of a lens to together provide a first portion of a total add power of a lens. One or more additional optical elements or features can then be positioned onto one or more different surfaces of the lens to provide a second portion of a total add power of the lens. Accordingly, a discontinuity or an optical zone comprising a discontinuity in accordance with an aspect of the present invention that is combined or collapsed onto a first progressive addition region of a lens can together comprise all or a portion of the total add power of the lens.

In a further example, a discontinuity or an optical zone comprising a discontinuity in accordance with an aspect of the present invention can be positioned to be in optical communication with a dynamic optical power element. A dynamic optical power element can be a dynamic optic or lens or portion thereof that can provide an optical power that is alterable with the application of electrical energy, mechanical energy or force. Either the entire lens may have an alterable optical power, or only a portion, region or zone of the lens may have an alterable optical power. The optical power of such a lens is dynamic or tunable such that the optical power can be switched between two or more optical powers. One of the optical powers may be that of substantially no optical power. Examples of dynamic lenses include electro-active lenses, meniscus lenses, movable dynamic optics having one or more components, gas lenses, and membrane lenses having a member capable of being deformed. A dynamic lens or optical power element may also be referred to as a dynamic optic, a dynamic optical element, a dynamic optical zone or a dynamic optical region.

As mentioned above, a discontinuity or an optical zone comprising a discontinuity in accordance with an aspect of the present invention can be of any size or shape, can be positioned on any portion of a lens surface, and can have any optical power value or magnitude.

An ophthalmic lens of the present invention comprising a discontinuity or an optical zone comprising a discontinuity in accordance with an aspect of the present invention can be fabricated using conventional ophthalmic lens manufacturing techniques. For example, a surface of an ophthalmic lens of the present invention comprising a discontinuity or an optical zone comprising a discontinuity can be fabricated, by way of example only, by diamond turning on metal or glass, or free formed on glass, slumped, or injection molded into a plastic disposable mold. As a further example, a surface of an ophthalmic lens of the present invention comprising a discontinuity or an optical zone comprising a discontinuity can be molded using a thermoset resin, molded using a light cured resin, or molded using a combined thermoset and light cured resin. Further, such a lens of the present invention can be, by way of example only, cast, injection molded, stamped, thermo-formed, or free-formed. Once the lens is surfaced or free formed to the final optical prescription, the lens can be edged and mounted into an eyeglass frame using convention techniques.

Conclusion

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. An ophthalmic multifocal lens, comprising:
   a progressive addition optical power region; and
   a discontinuity of surface slope positioned on a same surface as the progressive additional optical power region,
   wherein the ophthalmic multifocal lens is a monolithic lens,
   wherein the discontinuity of surface slope forms a portion of a boundary of a rotationally symmetric optical zone, and
   wherein the rotationally symmetric optical zone is a non-regressive rotationally symmetric optical zone.

2. The ophthalmic multifocal lens of claim 1, wherein the progressive addition optical power region and the discontinuity of surface slope are positioned on an external surface of the ophthalmic multifocal lens.

3. The ophthalmic multifocal lens of claim 1, wherein the rotationally symmetric optical zone is positioned on a near distance viewing zone of the progressive addition optical power region.

4. The ophthalmic multifocal lens of claim 3, wherein the rotationally symmetric optical zone provides a first component of the total add power of the ophthalmic multifocal lens and the progressive addition optical power region provides a second component of the total add power of the ophthalmic multifocal lens.

5. The ophthalmic multifocal lens of claim 4, wherein the first component and the second component together provide the total add power of the ophthalmic multifocal lens.

6. The ophthalmic multifocal lens of claim 1, wherein the discontinuity of surface slope forms a portion of a boundary of a bilaterally symmetric optical zone.

7. The ophthalmic multifocal lens of claim 1, wherein the discontinuity of surface slope coincides with a contour of substantially equal astigmatism.

8. The ophthalmic multifocal lens of claim 1, wherein the discontinuity of surface slope coincides with a contour of substantially equal average power.

9. An ophthalmic multifocal lens, comprising:
   a progressive addition optical power region; and
   a discontinuity of surface slope positioned on a same surface as the progressive additional optical power region,
   wherein the progressive addition optical power region and the discontinuity of surface slope are in optical communication with an additional optical element positioned on a separate surface of the ophthalmic multifocal lens, and
   wherein the additional optical element is a dynamic optical element.

10. An ophthalmic multifocal lens, comprising:
    a progressive addition optical power region; and
    a discontinuity of surface slope positioned on a same surface as the progressive additional optical power region,
    wherein the discontinuity of surface slope forms a portion of a boundary of a rotationally symmetric optical zone, and
    wherein the rotationally symmetric optical zone is a non-regressive rotationally symmetric optical zone.

11. The ophthalmic multifocal lens of claim 10, wherein the ophthalmic multifocal lens is a composite lens.

* * * * *